United States Patent [19]
Wang et al.

[11] Patent Number: 5,732,636
[45] Date of Patent: Mar. 31, 1998

[54] MAGNETIC LEVITATION SYSTEM

[75] Inventors: Tsih Chang Wang, Troy, Mich.;
Yeou-Kuang Tzeng, Hsinchu, Taiwan

[73] Assignee: National Science Council, Taipei, Taiwan

[21] Appl. No.: 658,651

[22] Filed: Jun. 5, 1996

[51] Int. Cl.$^6$ .................................................. B60L 13/06
[52] U.S. Cl. .................................................. 104/284
[58] Field of Search .................................. 104/281, 282, 104/284, 286

[56] References Cited

U.S. PATENT DOCUMENTS

| | | | |
|---|---|---|---|
| 3,797,403 | 3/1974 | Schwarzler et al. | 104/284 |
| 3,937,148 | 2/1976 | Simpson . | |
| 4,141,063 | 2/1979 | Nakamura | 104/284 |
| 5,067,415 | 11/1991 | Morishita et al. | 104/284 |
| 5,258,697 | 11/1993 | Ford et al. | 318/498 |
| 5,379,864 | 1/1995 | Colby | 104/284 |
| 5,528,210 | 6/1996 | Huang et al. | 104/286 |

FOREIGN PATENT DOCUMENTS 779127  11/1980  U.S.S.R. ............... 104/284

*Primary Examiner*—S. Joseph Morano
*Attorney, Agent, or Firm*—Knobbe, Martens, Olson & Bear, LLP

[57] ABSTRACT

A magnetic levitation system with a near zero power-loss and a high ratio of lift-force to permanent-magnet-weight is disclosed. The present magnetic levitation system includes a ground-fixed object for sustaining a carrier device; a hybrid electromagnetic device located opposite to the ground-fixed object and having a magnetic coil, an air gap being defined between the ground-fixed object and the hybrid electromagnetic device, the attracting force being generated in the air gap, the hybrid electromagnetic device including a permanent magnet and an E-shaped electromagnet; and a feedback control device electrically connected to the hybrid electromagnetic device for generating a voltage control signal in response to a size of the air gap and the current in the electromagnetic coil, the voltage control signal controlling the attracting force to move the carrier device upwardly or downwardly.

13 Claims, 6 Drawing Sheets

MAGNETIC LEVITATION SYSTEM

FIELD OF THE INVENTION

The present invention relates to a magnetic levitation system, and more particularly to a magnetic levitation system with a near zero power-loss and a high ratio of lift-force to permanent-magnet-weight. It will be recognized that the present invention has a wider range of applicability. Merely by way of example, the invention may be applied in the material handling system, the passenger transportation system, the high-speed magnetic bearing system, among others.

BACKGROUND OF THE INVENTION

The industry utilizes or has proposed various magnetic levitation ("maglev") systems in different applications since 1950s.

One of the conventional magnetic levitation systems, as shown in FIG. 1, applies the electromagnet as the lift-force source. After the current passes through the electromagnetic coil 11, a magnetic force is generated due to the electromagnetic induction of the electromagnetic coil 11 and the conventional electromagnet 12. The object 13 is therefore attracted and levitated.

The major drawbacks of this conventional magnetic levitation system are:

(1) The payload capacity is low due to the heavy weight and the large size of the magnetic components. Actually, the ratio of lift-force to magnetic-weight can only be 6.

(2) The heat dissipation is difficult due to the large amount of ohmic loss in the electromagnetic coil 11 (about 1.5 kw/ton).

(3) The current must be uninterruptedly supplied to the electromagnetic coil 11. The complete contactless levitation cannot be achieved.

Another one of the other conventional magnetic levitation systems applies the conception of the hybrid magnet, which combines a permanent magnet and an electromagnet. This conception was first proposed in 1970s, but was considered impractical because the characteristic of permanent magnet was not so excellent at that time.

Up to now, various permanent magnets of high magnetic energy product (such as NdFeB, SmCo) are developed. Therefore, another important magnetic levitation system was invented by Toshiba in 1989. Referring to FIG. 2, the C-shaped hybrid magnet 21 includes the permanent magnet 211 and the electromagnets 212. By the interaction of the hybrid magnet 21 and the electromagnetic coil 22, the object 23 is attracted and levitated.

This conventional system still has the following disadvantages.

(1) The applied C-shaped hybrid magnet 21 easily results in a large amount of leakage flux. The ratio of lift-force to permanent-magnet-weight is about 9, which acts adversely to the large scale transportation system.

(2) One method to solve the above-mentioned problem is to use the additional permanent magnet to raise the ratio of lift-force to the permanent-magnet-weight. Whereas, the manufacturing cost for this conventional magnetic levitation system is therefore increased due to the relatively higher cost of the permanent magnet. In addition, using additional permanent magnets will inevitably cause difficulties in manufacturing and assembling.

(3) The ratio of lift-force to total-hybrid-magnet-weight is only 3, so the load capacity is not satisfactory.

(4) The controller system in this magnetic levitation system is the conventional PID (proportional-integral-derivative) controller system. Because the magnetic levitation system is relatively non-linear and unstable, the PID controller system will seriously limit the stabilized area.

From the above it is seen that a more stabilized magnetic levitation system with a relatively higher ratio of lift-force to permanent-magnetic-weight, a relatively higher load capacity and a near zero power-loss is often desired.

SUMMARY OF THE INVENTION

One objective of the present invention is to provide a magnetic levitation system with a near zero power loss.

Another objective of the present invention is to provide a magnetic levitation system with a relatively higher ratio of lift-force to permanent-magnetic-weight.

Yet another objective of the present invention is to provide a magnetic levitation system with a relatively higher load capacity.

Still another objective of the present invention is to provide a robust magnetic levitation system.

In a specific embodiment, the present magnetic levitation system includes: a ground-fixed object for sustaining a carrier device; a hybrid electromagnetic device located opposite to the ground-fixed object, cooperating with the carrier device to constitute a levitated object and having a magnetic coil, an air gap being defined between the ground-fixed object and the hybrid electromagnetic device, the attracting force being generated in the air gap through the magnetic flux between the ground-fixed object and the hybrid electromagnetic device, the hybrid electromagnetic device including a permanent magnet and an E-shaped electromagnet; and a feedback control device electrically connected to the hybrid electromagnetic device for generating a voltage control signal in response to the length of the air gap and the current in the electromagnetic coil, the voltage control signal driving the power amplifier connected to the coil and controlling the attracting force to move the hybrid electromagnetic device upwardly or downwardly.

Certainly, the attracting force can be directly proportional to the square of the current and inversely proportional to the square of the length of the air gap. The E-shaped electromagnet can have a pair of side legs and a central leg arranged between the side legs. The permanent magnet can be located on the upper surface of the central leg. The feedback control device can automatically adjust the length of the air gap to approximate a zero power consumption.

Certainly, the ground-fixed object can further includes a supporting means; and a rail connected to the supporting means for sustaining the carrier device and the hybrid electromagnetic device. The cross-section of the rail can be E-shaped and the cross-sectional width of the rail can be slightly narrower than that of the E-shaped electromagnet for providing a larger lateral restoring force. The permanent magnet can be made of a rare earth metal and have the property of high magnetic energy product. The E-shaped electromagnet can be made of plural E-shaped silicon steel sheets. The magnetic coil can be disposed in the space between each of the side legs and the central leg.

Certainly, the hybrid electromagnetic device can include a fixed isolation member for sustaining the E-shaped electromagnet; two clamping means for fixing the electromagnetic coils in the space; and a contact-prevention fixing device sheltering the electromagnetic coil, the E-shaped electromagnet and the permanent magnet for preventing the hybrid electromagnetic device and the levitated object from tightly attracting each other when the air gap is relatively small and for preventing the permanent magnet and the electromagnetic coil from escaping from the E-shaped electromagnet. The two clamping means can be fixed together by an isolation glue.

Certainly, the feedback control device can include an air gap sensor for generating an air gap sensor signal in response to the size of the air gap; a coil current sensor for generating a coil current sensor signal in response to the current in the magnetic coil; a C-shaped fixing device having a first fixing device leg and a second fixing device leg, the air gap sensor being located on the first fixing device leg and the levitated object being located on the second fixing device leg, the air gap sensor and the levitated object being oppositely located. Such an arrangement can minimize the measuring error of the air gap sensor resulting from the magnetic flux of the electromagnet.

Certainly, the feedback control device can preferably further include an imperfect differentiator connected to the air gap sensor for generating an air gap variation rate signal in response to the air gap sensor signal; a resettable differentiator connected to the coil current sensor for generating an integration current signal in response to the coil current sensor signal; a signal addition device electrically connected to the air gap sensor and the resettable differentiator for summing up the air gap sensor signal and the weighted integration current signal to obtain a weighted signal output; a sliding mode generator electrically connected to the imperfect differentiator, the signal addition device and the coil current sensor for generating a sliding mode signal in response to the air gap variation signal, the weighted signal output and the coil current signal; a control voltage generator electrically connected to the coil current sensor, the signal addition device and the imperfect differentiator for generating a control voltage signal in response to the air gap variation signal, the weighted signal output and the coil current sensor signal; and a positive/negative switchable amplifier electrically connected to the sliding mode generator and the control voltage generator for generating a positive/negative switch signal in response to the sliding mode signal and the control voltage signal.

Certainly, the feedback control device can preferably further include a power amplifier electrically connected to the positive/negative switchable amplifier and the magnetic coil for generating a high power clockwise or counterclockwise current to be transmitted into the magnetic coil in response to the positive/negative switch signal.

The forgoing and other objects, features, and advantages of the present invention will be apparent from the following more particular description of a preferred embodiment of the invention, as illustrated in the accompanying drawings.

DETAILED DESCRIPTION OF THE PREFERRED EMBODIMENT

Figure 1:
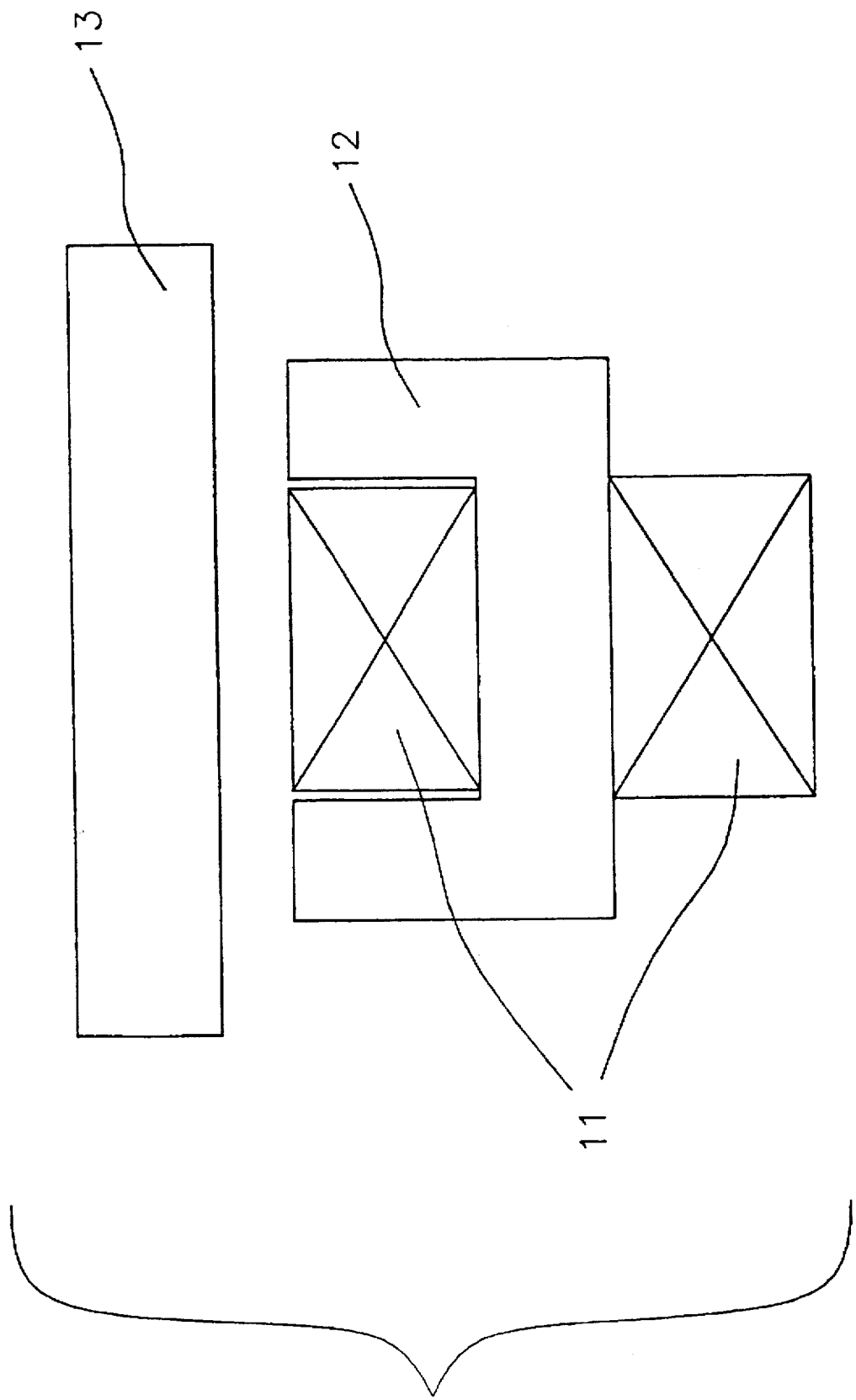
FIG. 1 schematically shows one conventional magnetic levitation system, which applies the electromagnet.
Figure 2:
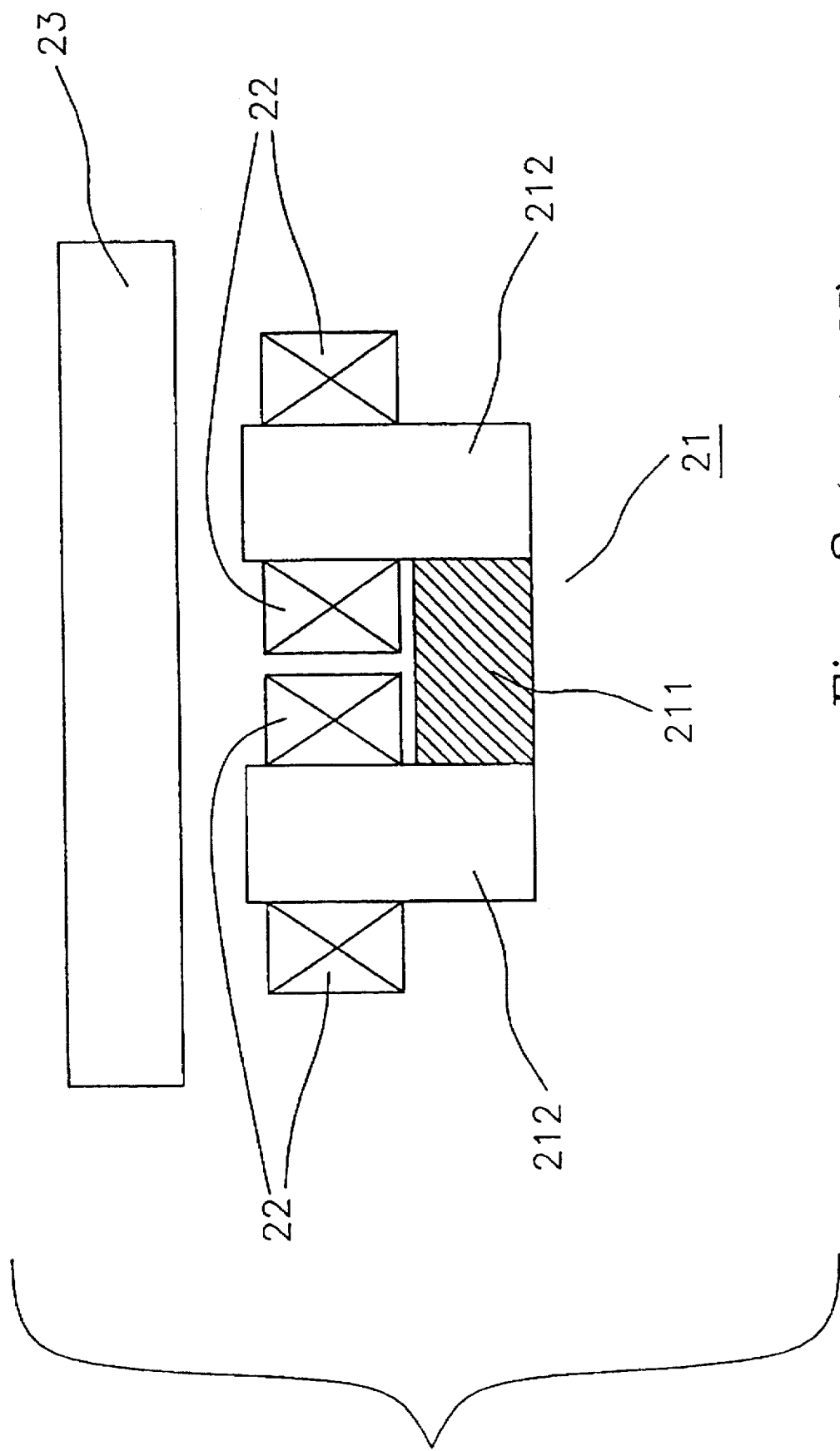
FIG. 2 schematically shows another conventional magnetic levitation system, which applies the hybrid magnet including the permanent magnet and the electromagnet.
Figure 3:
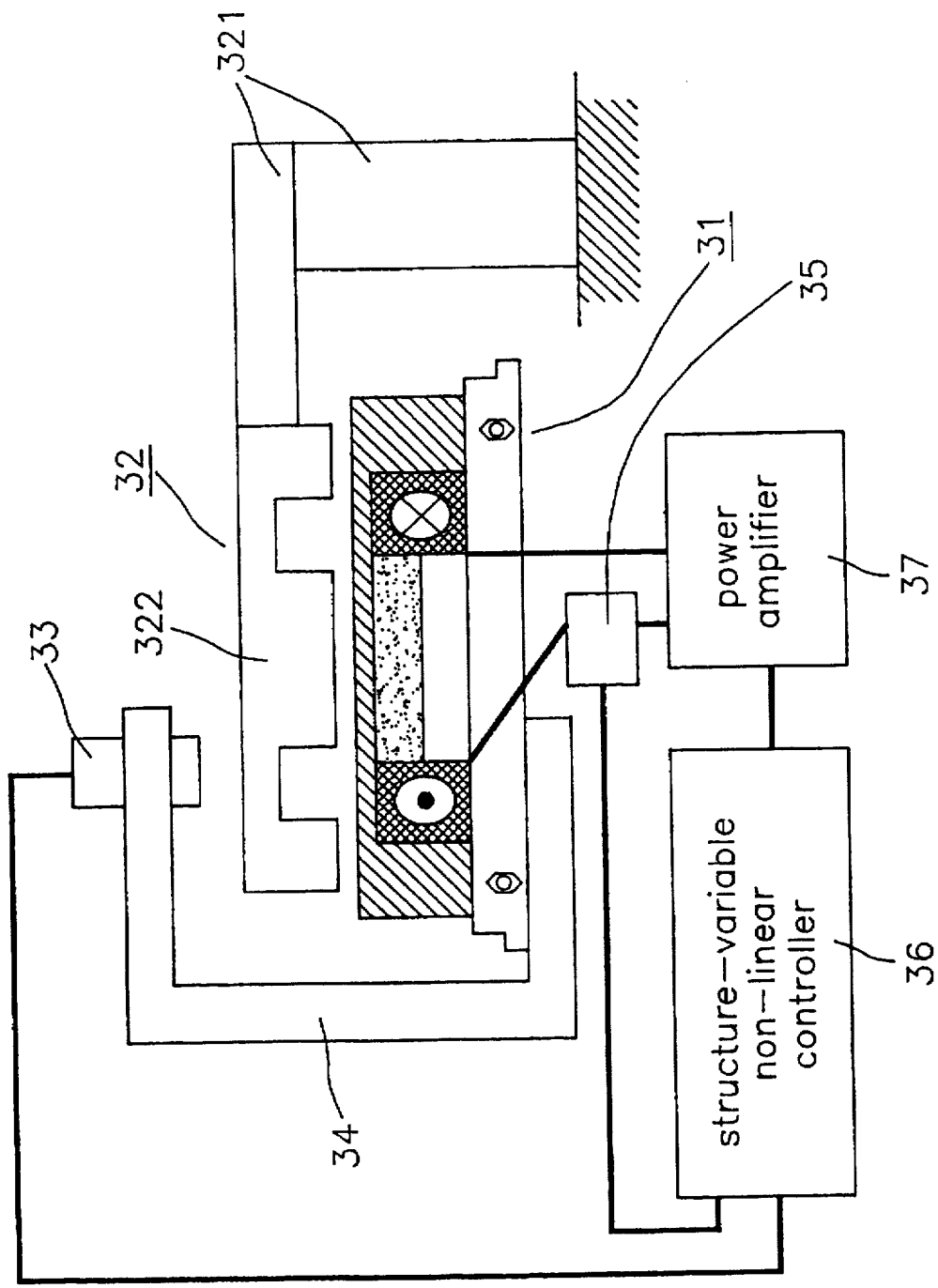
FIG. 3 schematically shows a magnetic levitation system according to the present invention.

One embodiment of the present invention, as shown in FIG. 3, includes an E-shaped hybrid magnet 31, a ground-fixed object 32, an air gap sensor 33, a C-shaped carrier device 34, a current sensor 35, a structure-variable non-linear controller 36 and a power amplifier 37. The ground-fixed object 32 further includes a supporting means 321 and a rail 322 connected to the supporting means 321. The rail 322 is used for sustaining the carrier device 34.

Figure 4:
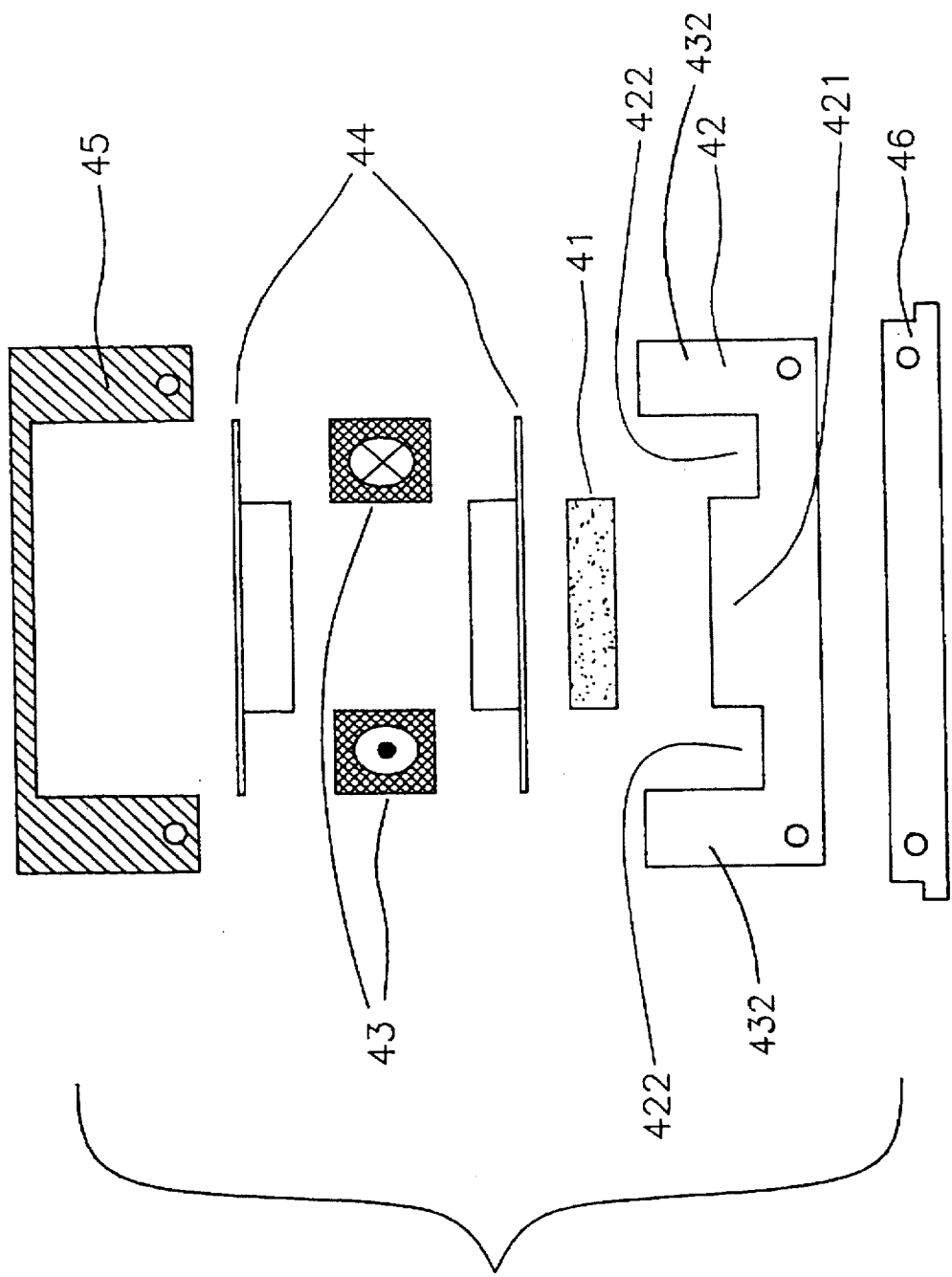
FIG. 4 schematically shows an E-shaped hybrid magnet according to the present invention.

The structure of the hybrid magnet 31 is shown in FIG. 4. The permanent magnet 41, which is made of a rare earth metal and has the property of a high magnetic energy product, is the major device for generating the magnetic force. The E-shaped electromagnet (E-core) 42 has a pair of side legs 432 spaced in a first direction and a central leg 421 arranged between the side legs 432. The permanent magnet 41 is located on the upper surface of the central leg 421. The E-shaped electromagnet 42 is made of E-shaped silicon steel sheets and has two opposite polarities to reduce the leakage flux. Plural electromagnet coils 43 are disposed in the space 422 between each of the side legs 423 and the central leg 421. A voltage is applied on the electromagnetic coils 43 to generate the magnetomotive force controlling the transition state movement of the magnet. Two clamping means 44 are also used for fixing the electromagnetic coils 43 in the space 422.

A contact-prevention fixing device 45, which is made of plastic steel wraps the E-shaped electromagnet 42. The contact-prevention fixing device 45 is used to shelter the electromagnetic coil 43, the E-shaped electromagnet 42 and the permanent magnet 41 for preventing the E-shaped hybrid magnet 31 and the levitated object 32 from tightly attracting each other when the air gap is relatively small. In addition, the contact-prevention fixing device 45 can also prevent the permanent magnet 41 and the electromagnetic coil 43 from escaping from the E-shaped electromagnet 42. The hybrid magnet 31 further includes a fixed isolation member 46 for sustaining the E-shaped electromagnet 42.

Figure 5:
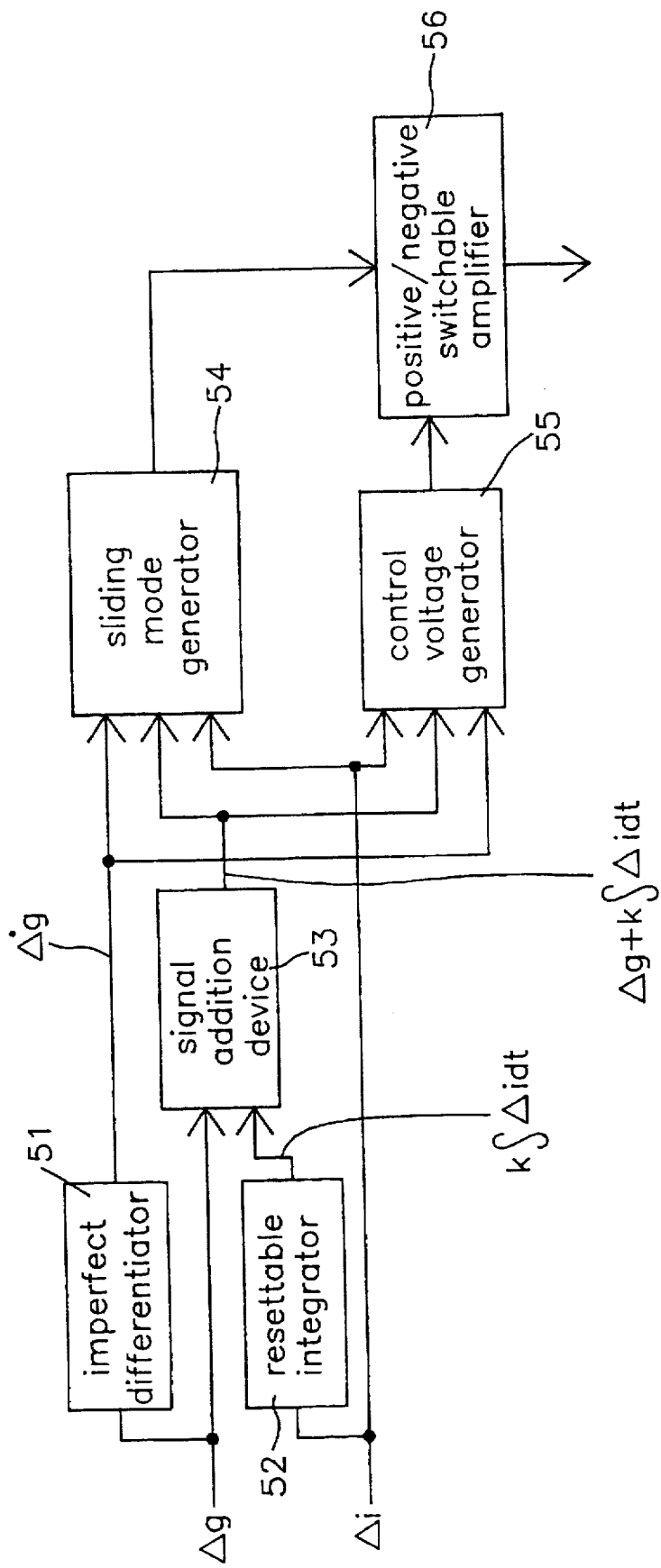
FIG. 5 schematically shows the block diagram of a structure-variable non-linear controller according to the present invention.

FIG. 5 schematically shows the block diagram of a structure-variable non-linear controller according to the present invention. The primary feedback signals are the air gap sensor signal $\Delta g$ obtained from the air gap sensor 33 and the coil current signal $\Delta i$ obtained from the current sensor 45. The air gap sensor signal $\Delta g$ and the coil current signal $\Delta i$ are respectively transmitted into the imperfect differentiator 51 and the resettable differentiator 52 to obtain an air gap variation rate signal $\Delta g$ and an integration current signal $\int \Delta i \, dt$. The air gap sensor signal and the amplified integration current signal are then transmitted into a signal addition device 53 to obtain a new signal $\Delta g + k \int \Delta i \, dt$. The new signal $\Delta g + k \int \Delta i \, dt$, the air gap variation signal $\Delta g$, and the coil current signal $\Delta i$ are respectively transmitted to a sliding mode generator 54 and a control voltage generator 55. The sliding mode generator 54 and the control voltage generator 55 then respectively generate the sliding mode signal and the control voltage signal. The sliding mode signal and the control voltage signal are then transmitted to a positive/negative switchable amplifier 56 to generate a positive/negative switch signal, thereby controlling the polarity of the output voltage of the amplifier 56.

The output signal of the structure-variable non-linear controller 36 (the positive/negative switch signal) is transmitted to the power amplifier, thereby driving the electromagnet coil 43 in FIG. 4.

Through the magnet flux between the levitated object 32 and the E-shaped hybrid magnet 31, the attracting force is generated in the air gap. This force is directly proportional to the square of current passing through the electromagnet coil 43 and is inversely proportional to the square of size (length) of the air gap. When the attracting force is too small, the positive current is supplied to the electromagnet coil 43 for generating the extra lift-force. The E-shaped electromagnet 42 is then lifted up until the proper air gap resulting in producing a suitable balancing force and making the coil current back to zero is obtained, and vice versa.

The above-mentioned situation can be automatically adjusted by the structure-variable non-linear controller 36. The air gap sensor signal $\Delta g$ from the air gap sensor 33 and the coil current signal $\Delta i$ from the current sensor 35 are transmitted into the structure-variable non-linear controller 36 to therefore generate the air gap variation $\Delta g$ and the new signal $\Delta g + k\int \Delta i\, dt$, which includes the air gap sensor signal $\Delta g$ and the amplified integration current signal $k \int \Delta i\, dt$. The integration current signal can serve as an observer for the load variation. When the load increases, the air gap decreases, and vise versa. That is, $\Delta g + k \int \Delta i\, dt \rightarrow 0$ It can be understood according to the law of conservation of energy. The steady-state output voltage is zero at any load, and the nearly zero power levitation can be achieved. In addition, owing to the structure-variable non-linear controller 36, the non-linearity of the magnetic levitation system can be effectively restrained.

Figure 6:
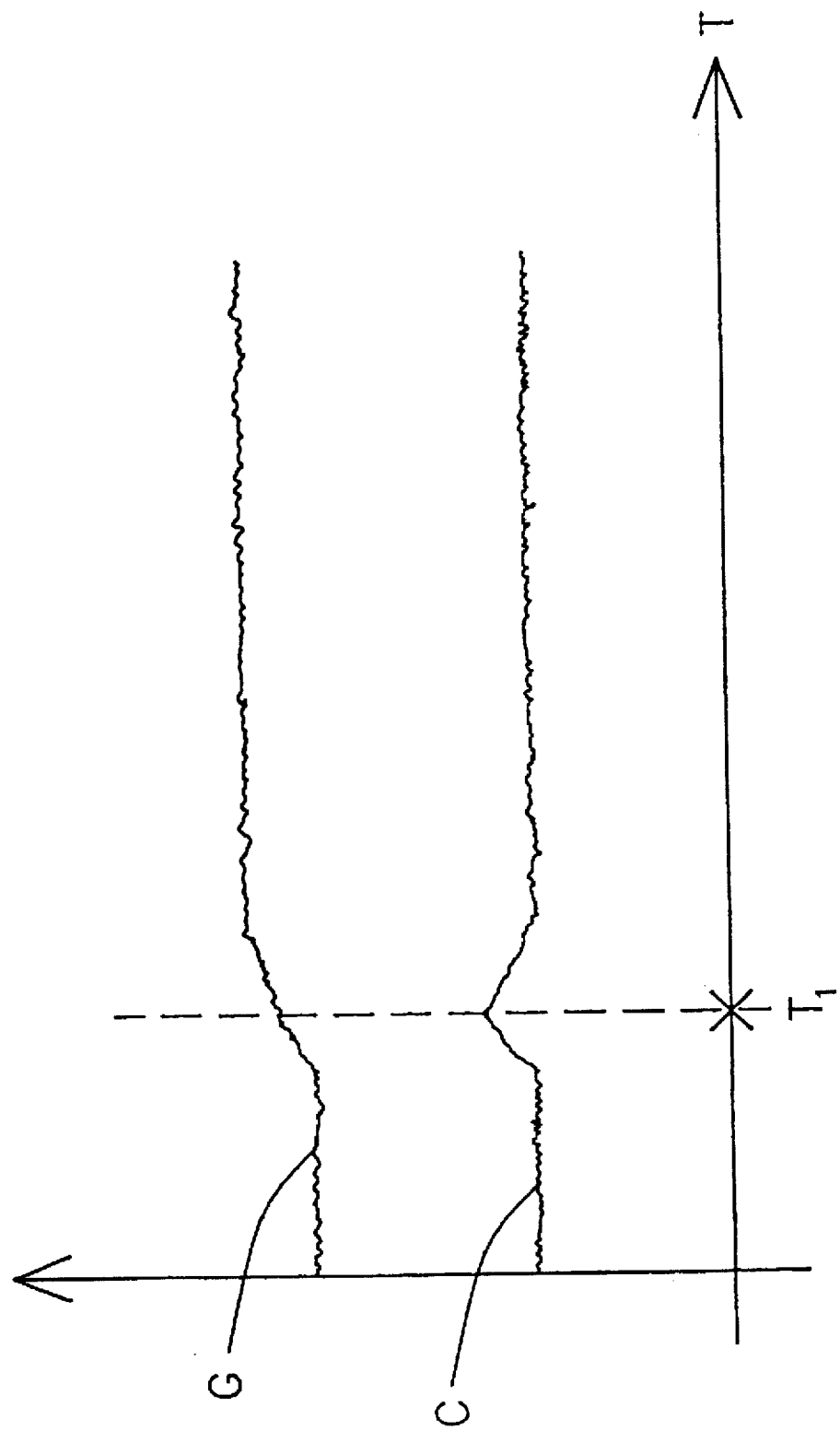
FIG. 6 schematically shows the waveform relation between the air gap sensor signal and the electromagnet coil current.

FIG. 6 shows the waveform relation between the air gap sensor signal and the electromagnet coil current. In FIG. 6, G indicates air gap sensor signal, C indicates the coil current signal, and T indicates the time. The rising waveform of the air gap sensor signal G at T1 is generated in response to the load exerted on the system. (Certainly, after T1, the load still exits.) At the time T1, the coil current signal C will vary accordingly. Whereas, for coil current signal C, the variation is only a transition state. The coil current signal will immediately return to the zero steady state, i.e. near a zero power consumption even with the exertion of load.

To sum up, with low leakage-flux design of the E-shaped hybrid magnet of the present invention, the ratio of the lift-force to permanent-magnet-weight is over 100, and the ratio of lift-force to total-hybrid-magnet-weight is over 10, which are more excellent than the conventional magnetic levitation systems. In addition, by the structure-variable non-linear controller, the near zero power-loss levitation can be achieved. Without the external continuous power supply, the absolute frictionless levitation can also be achieved. This stablized magnetic levitation system can further raise the load capacity. The weighted feedback of the integration current and the air gap sensor signal can lower the requirements of the precision of the air gap sensor and zero-level calibration, thereby raising the system reliability.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. For example, it would be possible to implement the present invention-in material handling system, passenger transportation system, high-speed magnetic bearing system, among others.

Therefore, the above description and illustration should not be taken as limiting the scope of the present invention which is defined by the appended claims.

What is claimed is:

1. A magnetic levitation system, comprising:

a ground-fixed object for sustaining a carrier device;

a hybrid electromagnetic device located opposite to said ground-fixed object and having an electromagnetic coil, an air gap being defined between said ground-fixed object and said hybrid electromagnetic device, an attracting force being generated in said air gap, said hybrid electromagnetic device comprising a permanent magnet and an E-shaped electromagnet with a central leg arranged between two side legs, said permanent magnet located on the upper surface of the central leg of said E-shaped electromagnet; and a feedback control device electrically connected to said hybrid electromagnetic device for generating a control voltage signal in response to a size of said air gap and a current in said electromagnetic coil, said control voltage signal controlling said attracting force to move said carrier device upwardly or downwardly.

2. A system as set forth in claim 1 wherein said feedback control device automatically adjusting said size of said air gap to approximate zero system power consumption.

3. A system as set forth in claim 1 wherein said ground-fixed object further comprises:

a supporting means; and a rail connected to said supporting means for sustaining said carrier device.

4. A system as set forth in claim 3, wherein a cross-section of said rail is E-shaped and a cross-sectional width of said rail is slightly narrower than that of said electromagnet to increase a lateral returning force between said ground-fixed object and said electromagnet.

5. A system as set forth in claim 1 wherein said permanent magnet is made of a rare earth metal and has a property of high magnetic energy product.

6. A system as set forth in claim 1 wherein said feedback control device further comprises:

an imperfect differentiator connected to said air gap sensor for generating an air gap variation rate signal in response to said air gap sensor signal;

a resettable differentiator connected to said coil current sensor for generating an integration current signal in response to said coil current sensor signal;

a signal addition device electrically connected to said air gap sensor and said resettable differentiator for summing up said air gap sensor signal and a weighted integration current signal to obtain a weighted signal output;

a sliding mode generator electrically connected to said imperfect differentiator, said signal addition device and said coil current sensor for generating a sliding mode signal in response to said air gap variation signal, said weighted signal output and said coil current signal;

a control voltage generator electrically connected to said coil current sensor, said signal addition device and said imperfect differentiator for generating a control voltage signal in response to said air gap variation signal, said weighted signal output and said coil current sensor signal; and a positive/negative switchable amplifier electrically connected to said sliding mode generator and said control voltage generator for generating a positive/negative switch signal in response to said sliding mode signal and said control voltage signal.

7. A system as set forth in claim 1 wherein said attracting force is generated through magnetic flux between said ground-fixed object and said hybrid electromagnetic device.

8. A magnetic levitation system, comprising:

a ground-fixed object for sustaining a carrier device;

a hybrid electromagnetic device located opposite to said ground-fixed object and having an electromagnetic coil, an air gap being defined between said ground fixed object and said hybrid electromagnetic device, an attracting force being generated in said air gap, said hybrid electromagnetic device comprising a permanent magnet and an E-shaped electromagnet made of plural E-shaped silicon steel sheets having opposite polarities to reduce a leakage flux between said ground-fixed object and said electromagnet; and a control device electrically coupled with said hybrid electromagnetic device for generating a control voltage signal in response to the size of said air gap and the current in said electromagnetic coil, said control voltage signal controlling said attracting force to move said carrier device upwardly and downwardly.

9. A system as set forth in claim 8 wherein said control device further comprises said carrier device having a first fixing device leg and a second fixing device leg, said air gap sensor being located on said first fixing device leg and said hybrid electromagnet device being located on said second fixing device leg, said air gap sensor and said hybrid electromagnetic device being oppositely located.

10. A magnetic levitation system, comprising:

a ground-fixed object for sustaining a carrier device;

a hybrid electromagnetic coil, an air gap being defined between said ground-fixed object and said hybrid electromagnetic device, an attracting force being generated in said air gap, said hybrid electromagnetic device comprising a permanent magnet and an E-shaped electromagnet having two side legs and a central leg, and said magnetic coil is disposed in a space between said central leg and each of said side legs; and a control device electrically coupled with said hybrid electromagnetic device for generating a control voltage signal in response to the size of said air gap and the current in said electromagnetic coil, said control voltage controlling said attracting force to move said carrier device upwardly and downwardly.

11. A system as set forth in claim 10 wherein said control device further comprises a power amplifier electrically connected to said positive/negative switchable amplifier and said magnetic coil for generating a high power clockwise or counterclockwise current to be transmitted into said magnetic coil in response to said positive/negative switch signal.

12. A system as set forth in claim 10, wherein said hybrid electromagnetic device further comprises:

a fixed isolation member for sustaining said E-shaped electromagnet;

two clamping means for seating said electromagnetic coils; and a contact-prevention fixing device for sheltering said electromagnetic coil, said E-shaped electromagnet, and said permanent magnet, to prevent said hybrid electromagnetic device and said ground-fixed object from tightly attracting each other when said air gap is relatively small, and to prevent said permanent magnet and said electromagnetic coil from escaping from said E-shaped electromagnet.

13. A system as set forth in claim 12, wherein said two clamping means are fixed together by isolation glue.

* * * * *